Jan. 5, 1954

N. ROZENOFF 2,664,665

TOY TELEPHONE SWITCHBOARD

Filed March 5, 1952

Inventor
Norma Rozenoff
By Wallace and Cannon
Attorneys

Patented Jan. 5, 1954 2,664,665

UNITED STATES PATENT OFFICE 2,664,665

TOY TELEPHONE SWITCHBOARD

Norma Rozenoff, Chicago, Ill.

Application March 5, 1952, Serial No. 274,925

6 Claims. (Cl. 46—45)

This invention relates to toys and especially to toy telephone switchboards.

Among the objects of this invention is to provide a novel toy telephone switchboard that will be both amusing and instructive in use.

Other objects are to provide a toy telephone switchboard of the plugboard type and to afford both visible and audible signals therein; to afford manually operable controls for the signals; to enable one or more of the signals to be rendered inoperative as an incident to the utilization of one of the plugs of the device; and to arrange at least selected of the manually operated controls so that such controls may be retained in either the operative or inoperative position thereof while other of the controls may be normally urged into the inoperative positions thereof.

Other and further objects of the present invention will be apparent from the following description and claims and are illustrated in the accompanying drawing which, by way of illustration, shows preferred embodiments of the present invention and the principle thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claims.

Figures 1, 2:
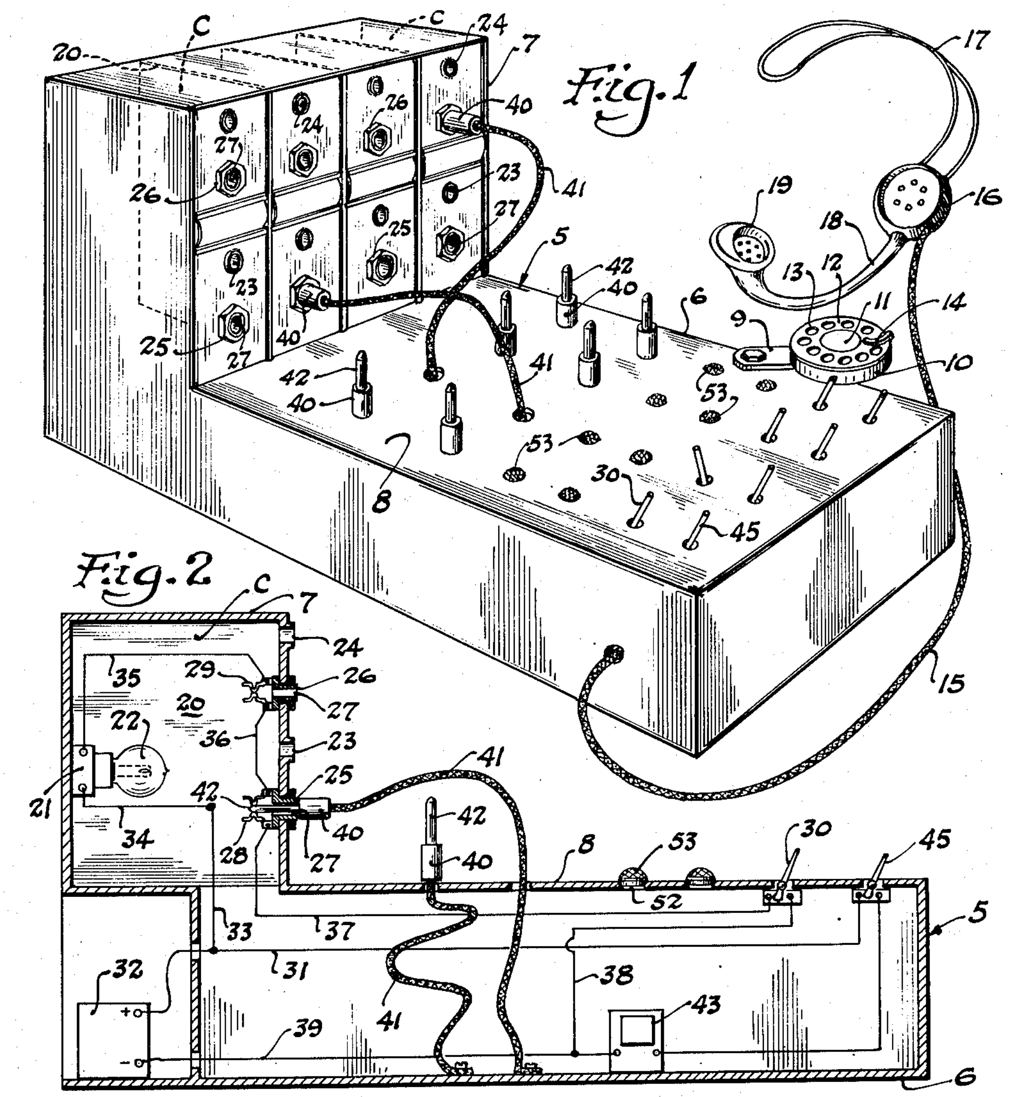
Fig. 1 is a perspective view of a toy telephone switchboard embodying my invention.
Fig. 2 is a longitudinal vertical sectional partially diagrammatic view of the toy telephone switchboard illustrated in Fig. 1.
Figure 3:
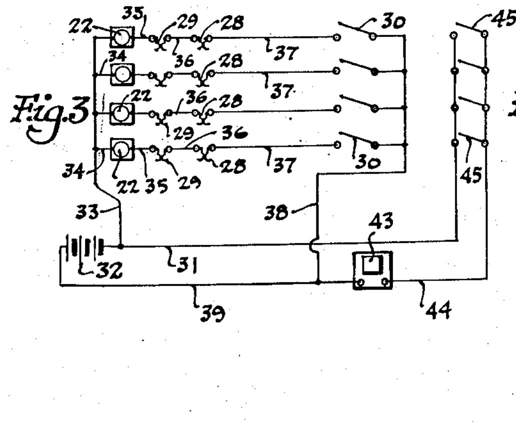
Fig. 3 is a wiring diagram of the electrical connections resorted to in one embodiment of my invention.

The toy telephone switchboard illustrated in Figs. 1, 2 and 3 of the accompanying drawing embodies the housing generally indicated by 5 and includes a flat box-like front portion 6 at the rear end of which there is an upstanding portion 7. The box-like portion 6 includes a top plate 8 along one edge of which a bracket 9 is suitably secured preferably, as shown in Fig. 1, near the forward right-hand corner thereof. The bracket 9 supports a disc 10 which has a spindle 11 at the center thereof about which a plate 12 is rotatable. A suitable stop (not shown) is provided for normally disposing the plate 12 in a predetermined position, the plate normally being biased into this position under the influence of a suitable spring (not shown). The plate 12 has ten openings 13 formed therein into any one of which a finger may be inserted to thereby enable the plate 12 to be rotated from its normal at rest position until the finger engages the stop 14. It will be recognized that this arrangement is quite similar to the conventional dialing arrangement provided for dial type telephones and of the nature that are associated with telephone switchboards of the plugboard type in those instances where the so-called dial system is in use.

A cord 15 anchored interiorly of the box-like portion 6 of the body 5 leads to an earpiece 16 that has a headband 17 secured thereto which, when disposed in engagement with the head, retains the earpiece 16 in association with the ear of the user. The bracket 18 extends from the earpiece 16 to a mouthpiece 19. Hence, this arrangement affords a structure quite like that conventionally provided with telephone switchboards of the plugboard type for use by the operator.

Since it is an object of this invention to afford a toy telephone switchboard that will be instructive in use, an arrangement has been provided which somewhat simulates that included in a conventional switchboard. To this end, the housing portion 7 has three vertical partitions as 20 provided therein which divide the housing 7 into four compartments C. A lamp socket 21 is secured to the rear wall of each such compartment and affords a support for a lamp 22, and the arrangement is such that one such lamp is provided in each compartment C. Vertically aligned openings as 23 and 24 are provided in the front wall of each compartment and when the lamp 22 in the particular compartment is rendered operative, light therefrom is visible through these openings. A jack as 25 is disposed below each opening as 23 and another jack as 26 is provided below each opening 24, such jacks each including a horizontally disposed axial opening as 27. Each jack as 25 includes normally closed contacts as 28 and each jack as 26 includes normally closed contacts as 29.

In order to render the lamps 22 operative, switches as 30 are mounted in alignment one with the other in a row in the top plate 8 near the forward edge thereof, and such switches are preferably of the type that may be retained in either the closed or the open positions thereof, a switch 30 being electrically associated with each lamp 22, as shown in Fig. 3.

As best shown in Fig. 3, a conductor 31 leads from a source of current such as a battery 32. A conductor 33 is connected to the conductor 31 and in turn is connected to one terminal of each of the lamps 22 by conductors as 34. A conductor as 35 leads from the other terminal of a lamp 22 to one of the normally closed contacts 29 of the jack 26 associated with the particular lamp 22. A conductor as 36 leads from the other contact of the contacts 29 to one of the normally closed contacts as 28 of the jack 25. A conductor as 37 leads from the other contact of the contacts as 28 to one terminal of the associated switch as 30. A conductor as 38 leads from the other terminal of each switch as 30 to a conductor 39 that leads to the source of current 32. Hence, so long as the contacts 28 and 29 of jacks 25 and 26 associated with a particular lamp 22 are closed, the closing of the associated switch 30 for the particular lamp will render the lamp operative and this lamp will remain operative so long as the particular switch 30 remains in the closed position thereof or until either the associated contacts 28 or 29 are separated. When a lamp as 22 is rendered operative in this manner, light therefrom is visible through the associated openings 23 and 24, and this has the effect of indicating an incoming call on lines with which the jacks 25 and 26 would be associated in a conventional telephone switchboard. In the present instance, however, such jacks are mounted in the front wall of the housing portion 7 and are in circuit with the associated lamp 22.

Plugs as 40 are provided which have cords 41 connected thereto, such cords being passed through suitable openings in the top plate 8 and having the free ends thereof suitably secured to a wall of the housing portion 6. Each plug 40 includes a projection 42 formed of non-conductive material and normally being mounted above the opening in the top wall 8 through which the associated cord 41 is passed. Desirably, a pair of plugs 40 is provided for each of the compartments C defined by the partitions 20, there being two rows of such plugs normally disposed in openings in the top plate 8 and the plugs in the respective rows are desirably aligned one with the other. When a switch 30 is moved to its closed position to render a lamp 22 operative, then one of the plugs 40 may be moved from a normally at-rest position on the top plate 8 and the projection 42 thereon may be inserted into the axial opening 27 of either the jack 25 or the jack 26 associated with such lamp. As shown in Fig. 2, the insertion of a projection 42 into an axial opening 27 of a jack as 25 has the effect of separating the contacts 28 thereof and this breaks the circuit to the associated lamp 22. Hence, the insertion of a plug 40 in a jack 25 or 26 simulates the answering of a call in a conventional telephone switchboard of the plugboard type.

It is advantageous to provide an audible signal in a device of the kind to which this invention pertains, and in the present instance I have provided a buzzer 43 which is mounted in the housing portion 6. The conductor 39 leads to one terminal of the buzzer 43 and in the present instance a conductor 44 leads from the other terminal of the buzzer to one of the terminals in the respective switches 45 which are mounted on the top plate 8 in a row and respectively in alignment with the respective switches 30, the switches 45 desirably being disposed intermediate the switches 30 and the forward edge of the top plate 8. The conductor 31 leads from the other terminals of the switches as 45 to the source of current 32. Hence, the closing of any one of the switches 45 has the effect of rendering the buzzer 43 operative. The switches 45 may either be of the type which may be maintained in either of the open or closed positions thereof, but in some instances it may be advantageous to so construct the respective switches 45 so that each is normally spring biased into its open position so that the switch will open when the operating member thereof is released by the user of the device.

Figure 4:
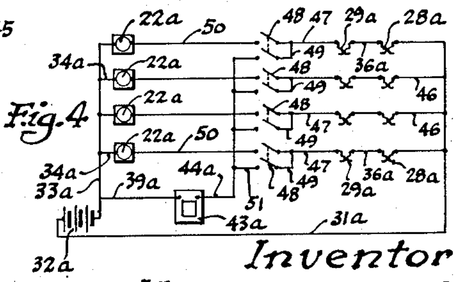
Fig. 4 is a wiring diagram of the electrical connections resorted to in another embodiment of my invention.

A modified form of my invention is illustrated in Fig. 4 and in this form of my invention a switch arrangement is provided which selectively renders one of the lamps as 22*a* operative and at the same time renders a buzzer as 43*a* operative, and the arrangement is such that the opening of the contacts as 29*a* or 28*a* electrically associated with the particular switch and lamp will be effective to render both the lamp and the buzzer inoperative.

In Fig. 4 the various elements which correspond to those which have been described hereinabove are identified by the reference character employed in Figs. 1 to 3 except that the suffix "*a*" is added to such reference characters in Fig. 4. Thus a conductor 31*a* leads from a source of current as a battery 32*a* to conductors as 46 which respectively lead to contacts as 28*a*. A conductor as 36*a* leads from the particular contacts 28*a* to associated contacts 29*a*. A conductor 47 leads to one terminal of a double poled switch as 48 and a conductor 49 leads from the conductor 47 to the other terminal of such a switch. A conductor 50 leads from one of the terminals of the double poled switch as 48 to one terminal of a lamp as 22*a*, the other terminal of such lamp being connected by a conductor as 34*a* to a conductor as 33*a* which leads to one terminal of the source of current. A conductor 51 leads from the other terminal of the double poled switch 48 to a conductor 44*a* which leads to one terminal of a buzzer as 43*a*, the other terminal of the buzzer being connected by a conductor 39*a* to the other terminal of the source of current. It will thus be seen that closure of a double poled switch as 48 is effective to close circuit to the associated one of the lamps 22 and also to the buzzer 43*a*, thereby rendering such lamp and such buzzer operative. When, however, a non-conductive portion 42 of a plug 40 is inserted between either the related contacts 29*a* or 28*a*, then the circuit to such lamp and the buzzer is opened and the same are thereby rendered inoperative.

The arrangement shown in Fig. 4 may be arranged physically in the same way as are the corresponding parts in Figs. 1 to 3, inclusive. In such an instance, the switches 45 may be omitted or dummy switches may be used in place thereof.

In order to enhance the attractiveness of the device of this invention and to have the same resemble a conventional switchboard of the plugboard type, a plurality of openings as 52 may be provided in the top plate 8 of the box-like portion 6 of the housing 5 and such openings are preferably closed by transparent crystals as 53. Desirably the openings 52 and the crystals 53 closing the same are arranged in two parallel rows with the crystals in one row respectively aligned with the crystals in the other row and also in alignment with respective plugs 40 and switches 30 and 45 in the rows of such plugs and switches provided on the top panel 8. When one of the lamps as 22 is operative, light therefrom causes the crystals as 53 to glow. If desired, crystals as 53 may be associated with respective openings as 23 and 24 to further add to the attractiveness of the device.

It will be manifest from the foregoing description that I have provided a toy telephone switchboard which enables the hereinabove set forth and kindred objects of this invention to be realized, and while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a device of the kind described, a housing including a flat box-like portion having an upstanding box-like portion at one end thereof, means dividing the upstanding portion into a plurality of compartments, the forwardly disposed wall of said upstanding portion having openings therein respectively in communication with said compartments, a lamp in each compartment, a jack-like member associated with at least selected of said openings and including a set of normally engaged contacts, each set of contacts being in circuit with the lamp in the compartment with which the opening associated with the jack member is in communication, a manually operable switch mounted in the housing in circuit with each set of contacts and the associated lamp and effective when closed to connect the lamp with a source of current to render the same operative, and means associated with said housing including a non-conductive portion selectively insertable between a set of contacts to thereby render the associated lamp inoperative.

2. In a device of the kind described, a housing including a flat box-like portion having an upstanding box-like portion at one end thereof, means dividing the upstanding portion into a plurality of compartments, the forwardly disposed wall of said upstanding portion having sets of openings therein, the openings of each set being in communication with one of the compartments, a lamp in each compartment, a jack-like member associated with the opening of each set thereof and each including a set of normally engaged contacts, the contacts of the jacks associated with a set of openings being in electrical circuit with the lamp in the compartment with which the openings are associated, a manually operable switch mounted in the housing in circuit with each lamp and effective when closed to connect the lamp with a source of current to render the same operative when the associated sets of contacts are closed, a plug-like member including a non-conductive portion and mounted on said housing and movable relative thereto whereby the non-conductive portion thereof may be inserted through a jack to separate a pair of the normally closed contacts to thereby render the associated lamp inoperative.

3. In a device of the kind described, a housing including a flat box-like portion having an upstanding box-like portion at one end thereof, means dividing the upstanding portion into a plurality of compartments, the forwardly disposed wall of said upstanding portion having sets of openings therein, the openings of each set being in communication with one of the compartments, a lamp in each compartment, a jack-like member associated with the opening of each set thereof and each including a set of normally engaged contacts, the contacts of the jacks associated with a set of openings being in electrical circuit with the lamp in the compartment with which the openings are associated, a manually operable switch mounted in the housing in circuit with each lamp and effective when closed to connect the lamp with a source of current to render the same operative when the associated sets of contacts are closed, a plug-like member including a completely non-conductive portion and mounted on said housing and movable relative thereto whereby the non-conductive portion thereof may be inserted through a jack to separate a pair of the normally closed contacts to thereby render the associated lamp inoperative, an audible signal, and switch means for controlling operation of said audible signal.

4. In a device of the kind described, a housing including a flat box-like portion having an upstanding box-like portion at one end thereof, means dividing the upstanding portion into a plurality of compartments, the forwardly disposed wall of said upstanding portion having openings therein respectively in communication with said compartments, a lamp in each compartment, a jack-like member associated with at least selected of said openings and including a set of normally engaged contacts, each set of contacts being in circuit with the lamp in the compartment with which the opening associated with the jack member is in communication, an audible signal in circuit with each set of contacts, a manually operable double poled switch mounted in the housing and having one pole thereof in circuit with each set of contacts and the associated lamp and the other pole in circuit with said audible signal and effective when closed to connect said lamp and said signal to a source of current to render the same operative, and a plug-like member mounted on said body and movable relative thereto and including a non-conductive portion insertable into a jack-like member to separate the contacts associated therewith and thereby render the associated lamp and said audible signal inoperative.

5. In a device of the kind described, a housing including a flat box-like portion having an upstanding box-like portion at one end thereof, the forwardly disposed wall of the upstanding portion having a set of horizontally spaced-apart openings therein, an electrical lamp in said upstanding portion in association with each of said openings whereby light therefrom is visible through said openings when the lamps are rendered operative, a set of normally engaged contacts mounted in a parallel arrangement on the forwardly disposed wall and each in circuit with a respective one of said lamps, a plurality of manually operable switches mounted in a parallel arrangement in said housing and each in circuit with a corresponding set of said contacts, said switches each being effective when closed to connect the corresponding lamp to a source of current through the corresponding set of contacts, and plug means associated with said housing including a non-conductive portion selectively insertable between said contacts to separate the same and thereby render the lamp corresponding thereto inoperative.

6. In a device of the kind described, a housing including a flat box-like portion having an upstanding box-like portion at one end thereof, the forwardly disposed wall of the upstanding portion having horizontally spaced-apart openings therein, an electrical lamp in said upstanding portion associated with each of said openings whereby light therefrom is visible through the opening when the lamp corresponding thereto is rendered operative, a set of normally engaged contacts mounted in a parallel arrangement on the forwardly disposed wall and each being in circuit with a corresponding lamp, a plurality of manually operable switches mounted in said housing in parallel arrangement and each in circuit with a corresponding set of contacts, said switches each being effective when closed to connect the corresponding lamp to a source of current, at least one plug member associated with said housing and including a non-conductive portion selectively insertable between said contacts to separate the same and thereby render the corresponding lamp inoperative, an audible signal, and switch means in the housing for controlling operation of said audible signal.

NORMA ROZENOFF.

References Cited in the file of this patent

FOREIGN PATENTS

| Number | Country | Date |
|---|---|---|
| 454,096 | Canada | Jan. 18, 1949 |

OTHER REFERENCES

Stromberg-Carlson—Telephones, Switchboard, Radio Apparatus, Supplies Catalogue (pages 81, 89, 93). Published 1928.